Feb. 24, 1953  G. C. J. LEGG ET AL  2,629,208
MACHINING OF TURBINE OR AXIAL COMPRESSOR BLADES
Filed Jan. 8, 1952  3 Sheets-Sheet 3
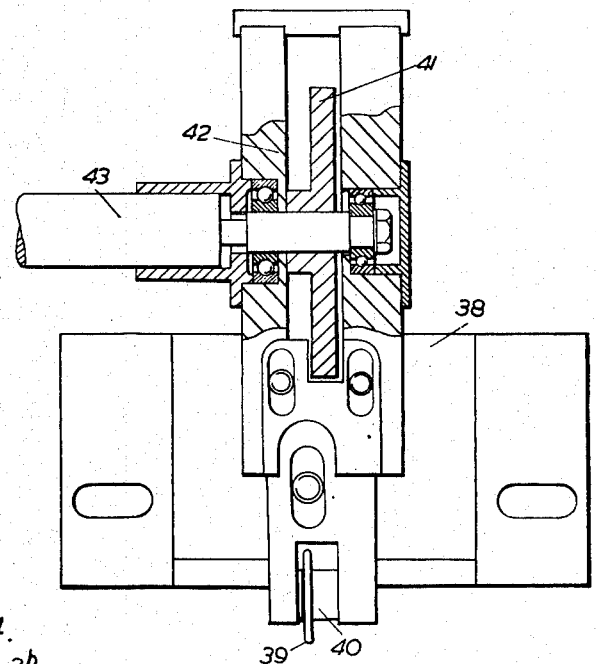
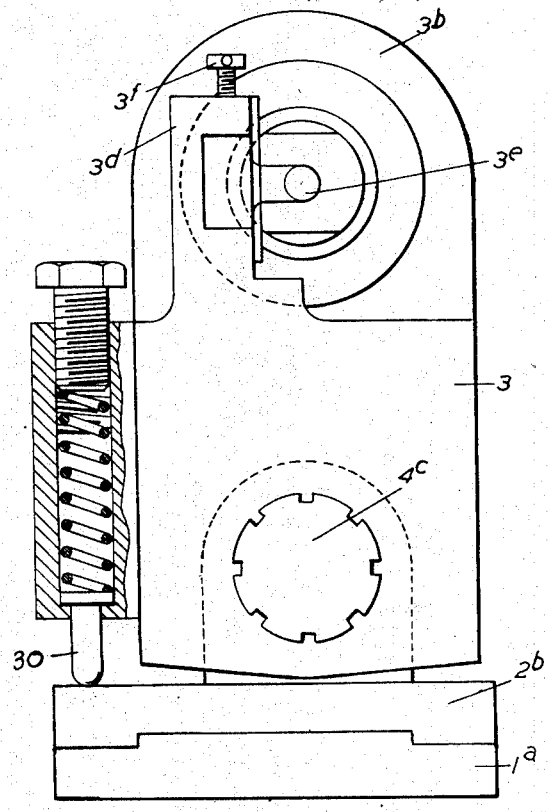
Inventor
George Charles James Legg
Charles Murray Mitchell
By
Emery Holcombe & Blair
Attorneys.

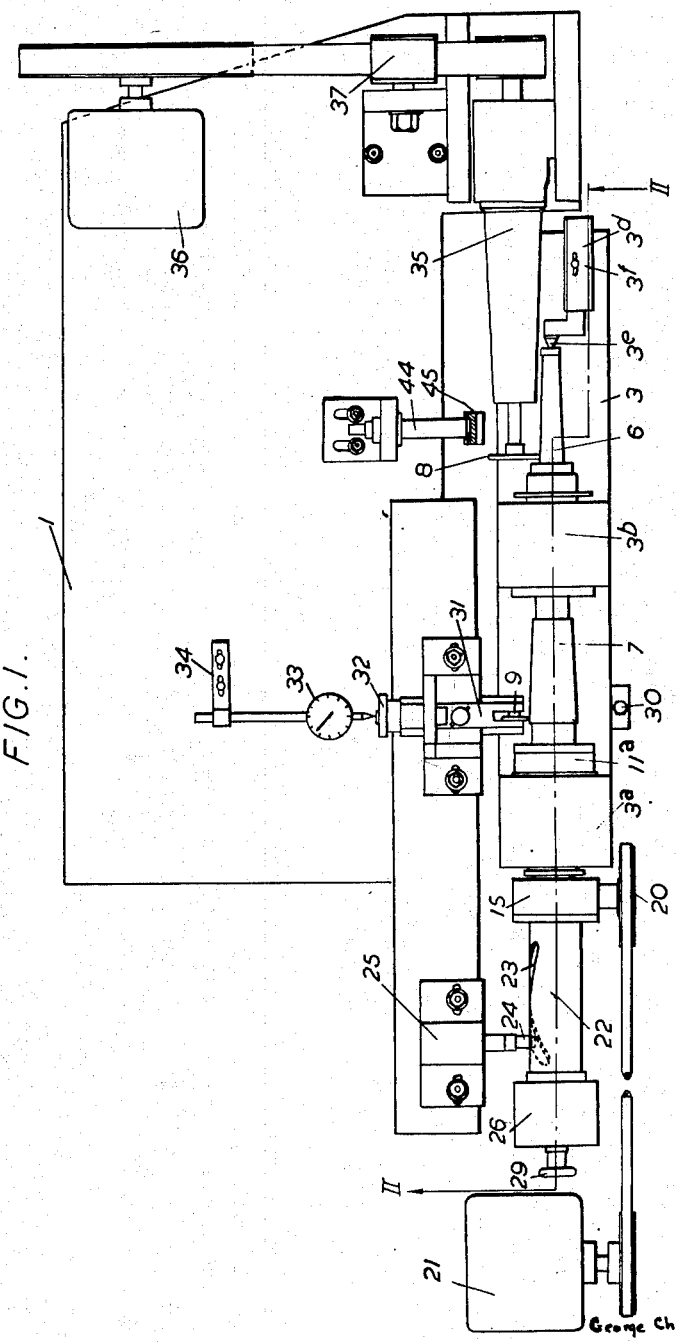

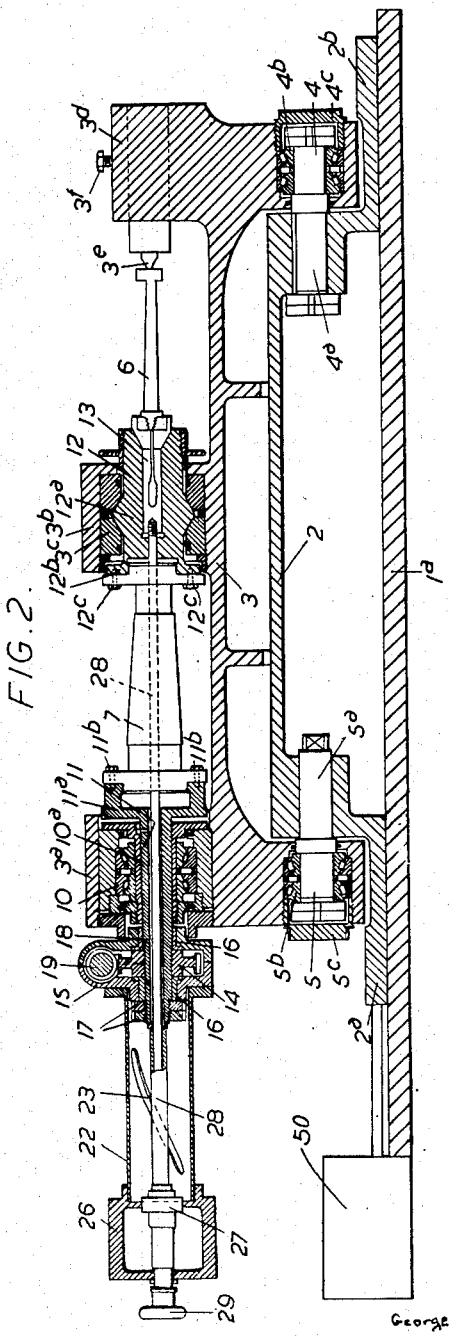

Patented Feb. 24, 1953

2,629,208

UNITED STATES PATENT OFFICE 2,629,208

MACHINING OF TURBINE OR AXIAL COMPRESSOR BLADES

George Charles James Legg, Brentford, and Charles Murray Mitchell, Heston, England, assignors to D. Napier & Son Limited, London, England, a British company Application January 8, 1952, Serial No. 265,504
In Great Britain August 28, 1950

8 Claims. (Cl. 51—101)

This invention relates to the machining of turbine or axial compressor blades, and more particularly to twisted blades that is to say blades having a twist about their longitudinal axis from the root to the tip of the blade, so that the pitch of the blade changes progressively from root to tip, for example so-called "free vortex" or "constant reaction" type blades.

Hitherto it has been customary to machine straight blades by means of a three-dimensional cam and follower mechanism, the cam being in the form of a blade former, that is to say having such relationship to the desired shape of the blade that a tool associated with the follower mechanism is made to follow with some precision the outline and shape of the blade. The blade to be machined and the blade former are normally mounted on one support while the follower and a suitable machine tool such as a grinding wheel are mounted on another support and are arranged to cooperate respectively with the blade former and the blade. Means are provided for moving the supports relatively to each other, the motion normally comprising a reciprocating longitudinal motion parallel to the length of the blade, a progressive rotary motion about an axis parallel to the length of the blade, and a motion transverse to the longitudinal axis of the blade which is controlled by the co-operation of the follower with the blade former, so that the blade is machined to a shape which is determined by the shape of the blade former.

It has been found that if this method is applied to the production of twisted blades the form of the blade, particularly at the edges tends to be imperfect.

Apparatus according to the invention for machining twisted turbine or axial flow compressor blades of the type referred to comprises a support for a blade, a support for a machine tool for shaping the blade, a blade former mounted on one of the supports cooperating with a follower on the other support, the two supports being arranged to move towards and away from one another in a direction transverse to the longitudinal axis of the blade, means for imparting a reciprocating motion to the blade support relatively to the tool support in a direction parallel to the longitudinal axis of the blade, means for simultaneously imparting an oscillating movement to the blade support relatively to the tool support in-phase with the reciprocating movement so as to impart to the blade and former relatively respectively to the tool and follower a combined reciprocating and oscillating movement corresponding to the twist of the blade and means for superimposing on the relative oscillating and reciprocating movement a rotary feed movement to bring successive areas of the blade and former into contact respectively with the tool and follower.

Preferably the blade and former are mounted on the same support with the tool and follower mounted on the other support and the support for the tool and follower is fixed while the combined oscillating and reciprocating movement with the superimposed rotary feed movement is imparted to the blade and former support.

The means for imparting the oscillating movement to the support for the blade and blade former may comprise engaging parts connected respectively to such support and to the support for the machine tool and follower which parts cooperate after the manner of a cam and cam follower under the action of the reciprocating motion of the support for the blade and blade former to impart the desired in-phase oscillating motion to that support.

In one convenient arrangement a member (hereinafter called the oscillating member) to which the oscillating movement is imparted by the engaging parts is connected to the support for the blade and blade former through gear mechanism which takes part as a whole in the oscillating movement and by which the desired progressive feed movement relatively to the oscillating member is imparted to the support.

The support for the blade and blade former preferably comprises a rotary member capable of rotating about an axis in a carrier which is so supported, preferably on pivots, as to be capable of rocking towards and away from the support for the follower and machine tool, the rotary member with or without the carrier being capable of reciprocating movement.

It will be apparent that the method of machining twisted turbine or axial flow compressor blades of the kind referred to according to the invention includes imparting to a blade being machined not only a progressive rotary movement about its longitudinal axis, and a longitudinal reciprocating movement relative to a machine tool but also a further oscillating movement about its axis so that the blade during the grinding or other machining operation has a helical motion corresponding to the twist of the blade.

The invention may be carried into practice in various ways but one particular application of the invention to a precision blade grinding machine will now be described by way of example, with reference to the accompanying drawings, in which:

Figure 1 is a plan view of the machine,

Figure 2 is a sectional front elevation on the line II—II of Figure 1,

Figure 3 is a view on an enlarged scale partly in section of a grinding attachment which may be used on the machine shown to produce a blade former from a master blade, and Figure 4 is an end view on an enlarged scale, partly in section, of the machine shown in Figure 1.

The apparatus comprises a fixed base 1 having a part 1a extending along one side of it, conveniently along the front side, formed to constitute a bed along which is arranged to silde a carriage. The carriage comprises a lower part 2 which is formed with two foot portions 2a and 2b which engage slide along a groove in the bed 1a and an upper part 3 which is pivotally connected to the lower part 2 by means of bearings 4 and 5 so as to be capable of rocking relatively thereto about a horizontal axis towards and away from the base 1 as a whole.

Each bearing 4 and 5, comprises a pin, 4a and 5a, carried by the lower part 2 of the carriage, and a double-taper roller bearing 4b and 5b, carried by the upper part 3 of the carriage and mounted upon the respective pin 4a, 5a. Dust caps 4c and 5a are provided at the outer end of each bearing.

The upper part 3 of the carriage is formed as hereinafter described to support a blade 6 to be shaped and a former 7 having an external form having the necessary relationship to the form which the blade is to be given, while the base 1 is provided with seatings for the mounting thereon of a high speed grinding tool 8 for example a diamond or other grinding wheel or milling cutter, to engage and form the blade 6 and a follower wheel 9 to engage the former 7 and thus control the movement of the upper part 3 of the carriage towards or away from the base 1 and hence the movement of the blade relatively to the grinding tool in accordance with the contour of the former when the carriage is moved longitudinally.

The upper part 3 of the carriage is formed and arranged to support the blade former 7 and the blade 6 as follows:

Formed or rigidly mounted on one end of the upper part 3 of the carriage is a housing 3a supporting a Timken type double taper roller bearing 10 having an inner sleeve 10a in which is mounted a hollow shaft 11 (hereinafter called the main shaft) provided at its inner end with a flanged member 11a formed to support one end of the blade former 7. At an intermediate point in the length of the upper part 3 of the carriage journal bearing 3c in which is rotatably mounted is another housing 3b supporting a double thrust a short hollow shaft 12 having a double conical thrust flange 12a the end of which adjacent to the main shaft is provided with a flange member 12b to support the other end of the former 7 while its other end has mounted within it a chuck device 13 of the split collet type formed to support one end of the blade 6 to be shaped. The arrangement of the main shaft in the housing 3a is such that the main shaft may be withdrawn somewhat to the left in Figure 2 so as to permit the former 7 to be inserted between the flange members 11a and 12b, after which the former is bolted in position between the flanges by means of the bolts 11b and 12c. The collet 13 is of the kind which as an externally conical part engaging a conical surface in the bore of the short shaft 12 so that its two parts are forced together to grip the adjacent end of the blade 6 when the collet is drawn into the bore in the short shaft 12 as hereinafter described. The end of the upper part 3 of the carriage remote from the main shaft 11 is provided with a part 3d resembling the tailstock of a lathe and carrying a centre 3e arranged to support the adjacent end of the blade 6 to be shaped. Adjustment of the centre 3e may be carried out by means of the adjusting screw 3f shown in Figure 4.

At the outer end of the main shaft 11 a worm wheel 14 is mounted for rotation with the shaft, while a gear casing 15 surrounding the worm wheel is rotatably mounted on bearing bushes 16 on either side of the worm wheel. Locking nuts 17 engaging a screw threaded portion at the outer end of the main shaft 11 cooperate with the outer bearing bush 16 to hold the worm wheel 14 hard up against a step 18 provided on the main shaft, and thus lock the worm wheel for rotation with the shaft. The casing 15 supports a worm 19 engaging the worm wheel 14, and the shaft of the worm extends outside the casing and carries a pulley 20, which is belt driven from a controlled variable speed D. C. motor 21 mounted to move with the carriage. It will be seen that if the worm 19 is held stationary, that is to say prevented from rotating, it cooperates with the worm wheel 14 to clock the gear casing 15 from rotation relative to the main shaft 11, whereas any rotation of the worm 19 caused by means of the motor 21 produces a corresponding relative rotation between the casing and the main shaft.

Detachably clamped to the outer side of the gear casing 15 and fixed for rotation therewith is a tubular sleeve 22 having a helical cam groove or slot 23 formed in it, the pitch of the helix corresponding to the twist of the blades which are to be formed by the apparatus. This cam slot is engaged by a follower member 24, which may be in the form of a pin or roller, and is rigidly supported on an attachment 25 secured to the base 1 of the apparatus. The outer end of the sleeve is engaged by an end cover 26 which is held in position by means of a collar 27 on a clamping rod 28, the rod being arranged to pass within the sleeve 22, the main shaft 11, the former 7, and the short hollow shaft 12. The inner end of the clamping rod is screw threaded to engage a corresponding screw thread on the end of the split collet 13, while the outer end of the rod is provided with a nut or handle 29, and it will be seen that by tightening up the clamping rod the collet 13 is drawn into the shaft 12 so as to grip the end of the blade 6, and at the same time the collar 27 on the rod engages the end cover 26 to lock the tubular cam sleeve 22 against the worm gear casing 15. When thus assembled it will also be seen that the blade 6, the collet 13, the short shaft 12, the former 7, and the main shaft 11 are locked together for rotational movement as one unit.

A spring pressed plunger 30 (best seen in Figure 4) is mounted on the upper part 3 of the carriage, and bears against the lower part 2 of the carriage, so as to tend to rock the upper part of the carriage towards the base 1 and thus maintain the follower 9, and grinding tool 8 always in engagement with the former and blade respectively.

Means are also provided for imparting the necessary longitudinal reciprocating movement to the carriage, but these driving means may be of any known type and since they form no part of the present invention they will not be described in detail. A diagrammatic reversing ram 50 is illustrated in Figure 2 of the drawings. The distance through which the carriage is reciprocated corresponds to the length of the blade which is to be shaped.

The follower wheel 9 is mounted in a supporting bracket 31, and its horizontal position may be adjusted by means of a fine-adjustment screw 32, the position of the follower at any time being indicated by a micrometer gauge 33 bearing against the screw 32 and held in a bracket 34 fixed to the base 1.

The grinding tool 8 is mounted in a comparatively heavy rigid attachment 35 secured to the base 1, and is belt driven from an electric motor 36 also mounted on the base. To ensure accurate shaping of the blade 6 the grinding head 8 must be coaxial with the follower wheel 9. An adjustable pulley 37 is provided to adjust the tension of the belt.

The operation of the apparatus as so far described is as follows: when the carriage is reciprocated longitudinally along the bed 1a the follower wheel 9 cooperates with the former 7 to rock the upper part 3 of the carriage towards and away from the base 1 against the pressure of the plunger 30, and the grinding head 8 imparts the corresponding profile to the blade 6. At the same time the follower member 24 cooperating with the cam slot 23 gives a helical oscillating motion corresponding to the twist of the required blade both to the former and to the blade to be shaped. The variable speed motor 21, which may be controlled to run at a constant low speed, or alternatively may run intermittently, imparts a further progressive or step-by-step rotary motion to the former 7 and to the blade 6 relative to the cam sleeve 22, thereby progressively feeding different portions of the surfaces of these parts into engagement respectively with the follower 9 and the grinding head 8.

Therefore if the amount of metal which is to be removed from the blade to be shaped 6 is more than conveniently can be removed in one "cut," the position of the follower wheel 9 may be altered for one or more preliminary grinding operations. The follower wheel is in this case first brought into its correct final position coaxial with the grinding head 8 for accurate final machining of the blade 6, and in this position the micrometer gauge 33 is set to zero. The follower is then moved slightly away from the base 1, so as to hold the former 7 and the blade 6 away from their true positions, and the distance moved is recorded by the micrometer 33. It is then possible to subdivide the whole machining operation of the blade into as many steps as may be desired by moving the follower wheel 9 in successive steps until it reaches its true position in which the micrometer gauge has been set at zero. It will be seen that the difference between the radii respectively of the grinding wheel 8 and follower wheel 9 is equal to the difference between the distance of any given point on the former 7 from the axis about which it oscillates and the distance between the corresponding point on the blade 6 from such axis after final forming of the blade.

Means are also provided for shaping a blade former from a master blade. For this purpose the master blade is mounted in place of the blade to be shaped 6, and the unshaped former is mounted in the position normally occupied by the former 7. The follower 9 and its supporting attachment 31 are replaced by a diamond grinding wheel attachment 38 shown in Figure 3. This grinding attachment 38 comprises a diamond grinding head 39 mounted coaxially with a driven pulley 40, and a driving pulley 41 mounted in bearings in a housing 42, with a belt (not shown) extending between the two pulleys. The pulley 41 is driven through a flexible driving shaft 43 from a motor, not shown, and the complete attachment is rigidly mounted on the base 1.

The normal grinding tool 8 is for this purpose replaced by a follower wheel, and an adjustable support 44 mounted on the base 1 and having a swivel head 45, is provided for holding the follower wheel rigidly in position.

The operation of shaping the former from the master blade is substantially the same as that described with reference to the shaping of blades.

What we claim as our invention and desire to secure by Letters Patent is:

1. Apparatus for forming twisted blades comprising a blade support for a blade to be formed, a suitably profiled former mounted on said blade support, a tool support for a machine tool for shaping the blade, a follower mounted on said tool support and co-operating with said profiled former, the two supports being arranged to be capable of movement relative to one another in a direction transverse to the longitudinal axis of the blade, means for imparting a reciprocating motion to the blade support in a direction parallel to the longitudinal axis of the blade, means for simultaneously imparting an oscillating movement about a longitudinal axis to the blade support in-phase with the reciprocating movement, so as to impart to the blade and profiled former a combined reciprocating and oscillating movement corresponding to the twist of the blade, and means for superimposing on the relative oscillating and reciprocating movement a rotary feed movement to bring successive areas of the blade and profiled former into contact respectively with the tool and follower.

2. Apparatus as claimed in claim 1, in which the means for imparting the oscillating movement to the blade support comprise a part connected to the blade support and an engaging part connected to the tool support, which parts cooperate after the manner of a cam and cam follower under the action of the reciprocating motion of the blade support to impart the desired in-phase oscillating motion to the blade support.

3. Apparatus as claimed in claim 2, including gear mechanism between the part connected to the blade support and the blade support itself, by which the desired progressive feed movement is imparted to the blade support.

4. Apparatus as claimed in claim 3, including a rocking member carrying said blade support, a base member capable of the required longitudinal movement, the rocking member being pivotally mounted on said base member so as to be capable of rocking movement in a direction transverse to the longitudinal axis of the blade.

5. Apparatus as claimed in claim 1, in which one of the two supports is carried by a rocking member mounted on pivots so as to be capable of rocking movement in a direction transverse to the longitudinal axis of the blade.

6. Apparatus for machining twisted blades comprising a base member, a carriage capable of longitudinal movement relative to said base member, means for imparting a reciprocating motion to said carriage, a rocking member pivotally supported from said carriage so as to be capable of rocking movement in a direction transverse to said longitudinal motion, a rotary support mounted in a bearing in said rocking member, and adapted to support a blade to be machined and a profiled former with their longitudinal axes parallel to said longitudinal reciprocating movement, a cam member rotatable relatively to the rocking member about the axis of the rotary support, a cooperating member mounted on said base member and cooperating with said cam member to impart an oscillating motion to said cam member in-phase with said reciprocating longitudinal movement, gear mechanism operatively connected between said rotary support and said cam member for imparting a progressive rotation to said support relatively to said cam member, a follower mounted on said base member and arranged to cooperate with the profiled former, and a machine tool for shaping the blade to be shaped mounted on said base member.

7. Apparatus as claimed in claim 6, in which the follower is adjustable in a direction transverse to said longitudinal motion, so as to vary the depth of the cut made by said machine tool.

8. Apparatus as claimed in claim 6, including a motor, and a flexible drive between said motor and said gear mechanism.

GEORGE CHARLES JAMES LEGG.
CHARLES MURRAY MITCHELL.

REFERENCES CITED

The following references are of record in the file of this patent:

UNITED STATES PATENTS

| Number | Name | Date |
|---|---|---|
| 1,354,453 | Nueske | Sept. 28, 1920 |
| 2,352,608 | Archer | July 4, 1944 |
| 2,529,026 | Kestell | Nov. 7, 1950 |
| 2,597,648 | Lucas | May 20, 1952 |